B. TAYLOR.
DUMP TRUCK.
APPLICATION FILED JUNE 1, 1920.

1,358,346.

Patented Nov. 9, 1920.
3 SHEETS—SHEET 1.

INVENTOR
Blake Taylor.
By N. E. Dunlap
ATTORNEY

B. TAYLOR.
DUMP TRUCK.
APPLICATION FILED JUNE 1, 1920.

1,358,346.

Patented Nov. 9, 1920.
3 SHEETS—SHEET 3.

INVENTOR
Blake Taylor
BY
H. E. Dunlap
ATTORNEY

UNITED STATES PATENT OFFICE.

BLAKE TAYLOR, OF ROANOKE, VIRGINIA.

DUMP-TRUCK.

1,358,346.   Specification of Letters Patent.   Patented Nov. 9, 1920.

Application filed June 1, 1920. Serial No. 385,443.

*To all whom it may concern:*

Be it known that I, BLAKE TAYLOR, a citizen of the United States of America, and resident of Roanoke, county of Roanoke, and State of Virginia, have invented certain new and useful Improvements in Dump-Trucks, of which the following is a specification.

This invention relates broadly to dump trucks, and more particularly to a dump body for trucks.

The primary object of the invention is to provide a dump body for trucks and the like having improved mechanism associated therewith whereby actuation thereof to dumping position may be effected with a minimum of manual effort.

A further object is to provide a novel form of body mounting and associated actuating mechanism so arranged that following initial movement of the body toward dumping position, effected by manual force, the body becomes overbalanced and is caused to complete its movement to dumping position by force of gravity.

With these and other objects in view, the invention resides in the features of construction, arrangement of parts and combinations of elements which will hereinafter be fully described, reference being had to the accompanying drawings, in which—

Referring to said drawings, in which like designating characters distinguish like parts throughout the several views—

Figure 1:
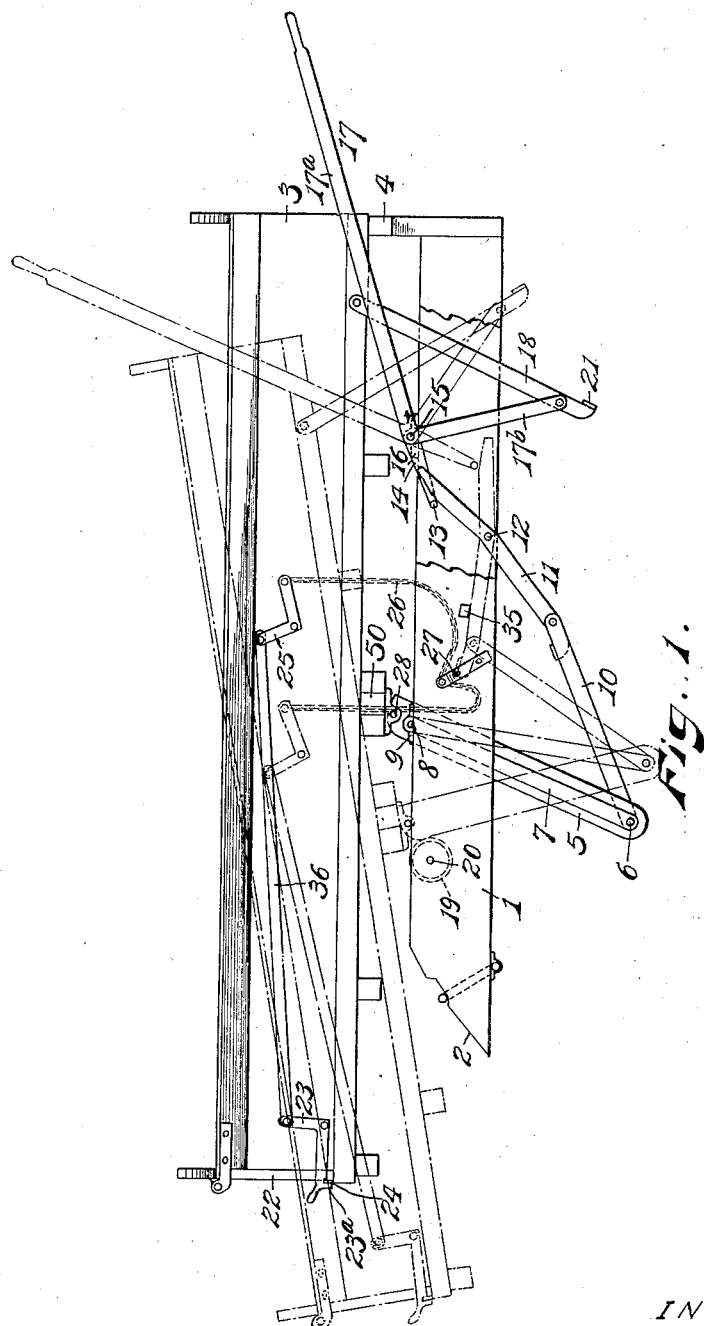
Figure 1 is a side elevation of the invention, showing in full lines the body in its normal upright position, and showing in broken lines approximately the position assumed when the force of gravity comes into play.

1 indicates longitudinally extending sills adapted for permanent mounting upon a truck frame or automobile chassis (not shown) and having beveled ends 2. Superposed over said sills is a dump body 3 which, in normal position, has its front end resting upon a transverse member 4 carried by said sills or by any other suitable form of support. Fixed on the under side of the body 3 approximately midway between the ends of the latter is a transverse bolster 50 to which are pivotally attached the upper ends of supporting arms 5 which, in the normal position of the body, incline slightly in an upward and forward direction. The lower end of each of said arms 5 is supported by a pivot-pin 6 carried by the lower end of a bar 7 which is, in turn, supported at its upper end by a pivot-pin 8 mounted in a suitable bearing 9 carried on the top of the adjacent sill 1. It will thus be apparent that, except at its front end, the body 3 is supported from the bearings 9 through the intermediacy of the arms 5 and bars 7, which elements in the normal position of the body, are folded in jack-knife fashion into parallel relation, as shown in full lines in Fig. 1.

Also mounted upon the pivot-pin 6 is one end of a link 10 which extends thence forward and upward and is pivotally attached at its opposite end to one end of a lever 11. Said lever is pivotally mounted intermediate its ends upon a short rod or bolt 12 which is mounted in the adjacent sill 1. Normally disposed in overlying relation to the forward end of said lever 11 is a laterally extending bolt or pin 13 carried by the free end of an arm 14 which is fixed upon a transverse shaft 15 journaled in bearings 16 mounted upon the sills. Said shaft 15 has one of its ends projected outward a suitable distance, and rigidly mounted upon said end is the angle portion of an operating lever 17 which is of approximately L shape and the main arm $17^a$ of which normally occupies the upwardly and forwardly inclined position shown in full lines in Fig. 1. The other arm $17^b$ of said operating lever is downwardly and forwardly inclined and has its free end pivotally attached to the lower end portion of a link 18 which is upwardly and forwardly inclined and which has its opposite end pivotally connected to the body 1 at a point adjacent to the front end of the latter.

In practice, when the body 3 is to be shifted to dumping position, the operating lever is first swung back manually to approximately the position indicated in broken lines in Fig. 1. This movement results, first, through the lever arm $17^b$ and the link 18, in elevating the front end of the body 3 from its seated position on the supporting member 4, and, second, in forcing said body to move in a rearward direction upon supports which consist of the arms 5 and bars 7. In said movement each of the supporting arms 5 is shifted from its aforesaid normal upwardly and forwardly inclined position to an upwardly and rearwardly inclined position, whereas each of the bars 7 is swung forward on its pivotal mounting so that it occupies a position more nearly vertical, as shown in broken lines in Fig. 1. At the limit of said movement, the rear upper end portion of each of the supporting arms 5 assumes abutting relation to the periphery of an adjacent anti-friction roller 19 which is carried by a suitably located transverse shaft 20 having its ends mounted in the sills 1.

Figure 2:
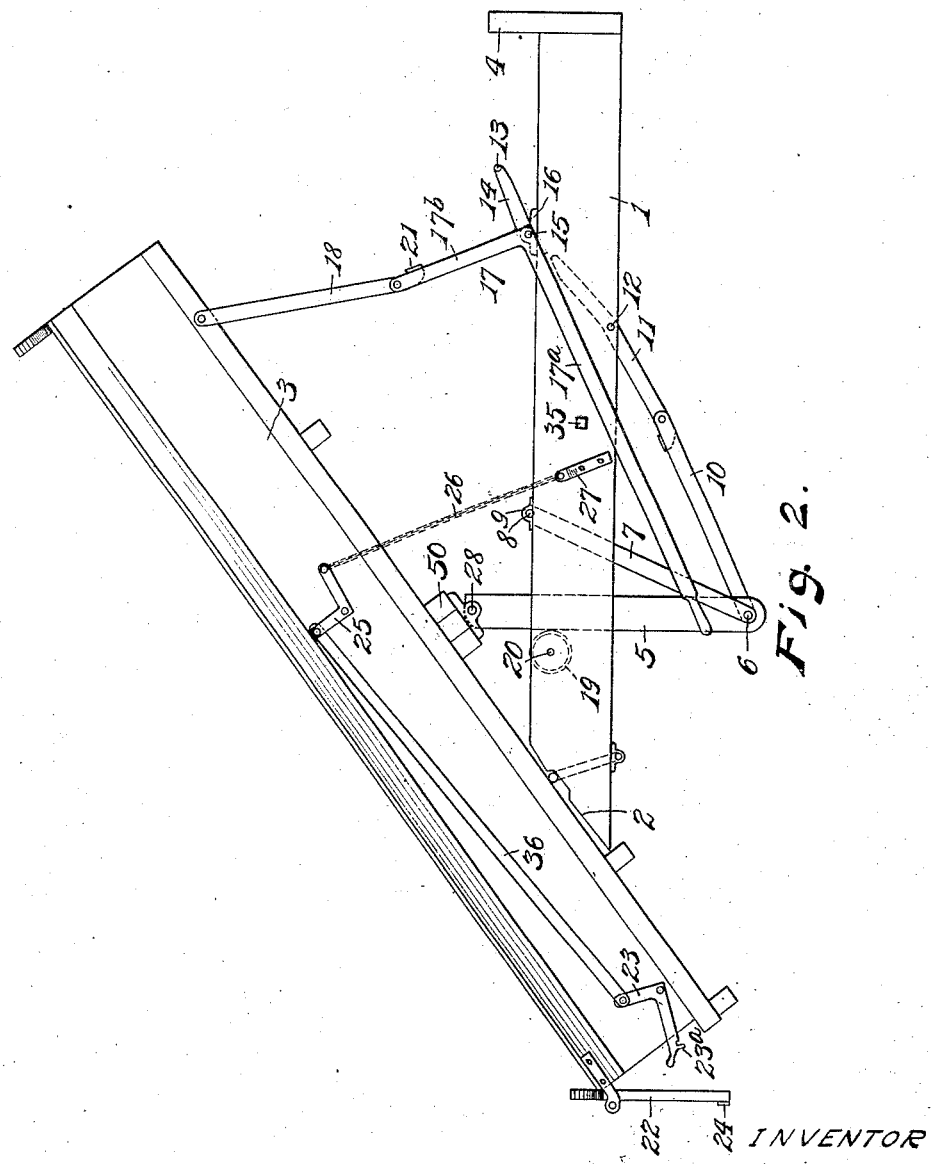
Fig. 2 is a similar view showing the body in final dumping position.
Figure 3:
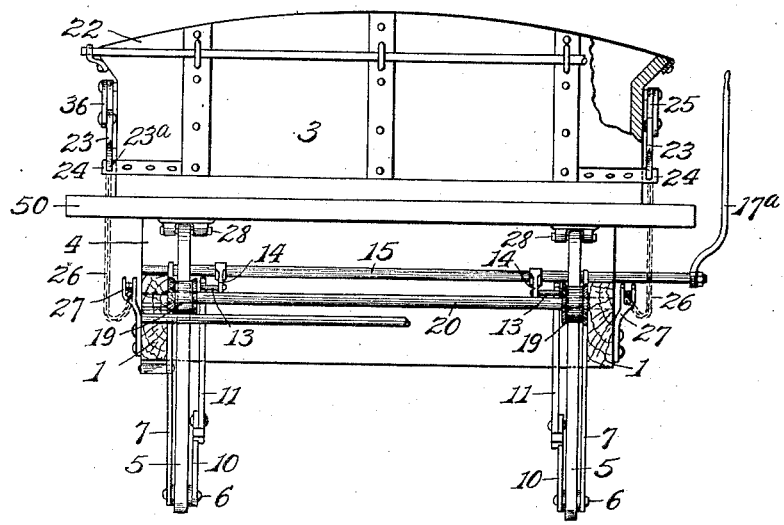
Fig. 3 is a rear end elevation.

The aforesaid movement of the arms 5 and bars 7 for producing rearward shifting movement of the truck body is facilitated by the series of coöperating members located intermediate the shaft 15 and the pivot-pin 6. Specifically stated, when the shaft 15 is rocked in its bearings 16 by the upward and rearward swinging movement of the operating lever, downwardly directed force is applied to the forward end of each lever 11 by the bolt or pin 13 carried by the adjacent arm 14 which is fixed on said shaft 15. This force acts to swing said lever 11 to the approximately horizontal position indicated by broken lines in Fig. 1, actuating the link 10 to move forward at its lower end, whereby the position of the lower end of the supporting arm 5 is advanced past the point in which it lies in vertical alinement with the upper pivoted end of said arm, for causing said arm to swing back against the adjacent roller 19. Further rearward movement of the lower end of the arm 5 is prevented by engagement of the lever 11 with a suitably located stop 35 formed on the sill 1. At or adjacent to the position of the parts shown in broken lines in Fig. 1, the body which has been moved manually to such position, becomes overbalanced and thence moves by force of gravity to the full dumping position shown in Fig. 2 without further application of manual force; and in moving to said dumping position said body actuates the various operative parts associated therewith to assume the positions shown in Fig. 2, the arms 5 being caused to move upward in engagement with the peripheries of the rollers 19 to permit of the requisite inclination of the body. When the requisite inclination has been assumed, the forward end of the body becomes anchored against further movement by the then nearly alined link 18 and arm 17ᵇ of the operating lever 17. Movement of said link and said arm into true alinement is prevented by a laterally directed lug or stop 21 formed on said link and which is engaged by said arm at the proper limit.

To return the truck body to normal position following the dumping operation, the operating arm 17ᵃ of the lever 17 is manually shifted upward and forward to a point slightly in advance of the broken line position indicated in Fig. 1, whereupon said body and the parts associated therewith, as aforesaid, will automatically move to the full line position shown in said figure.

To provide for automatic opening of the end gate 22 carried by the body so that the contents of the latter will unobstructedly fall therefrom when the dumping position is reached, I provide a special mechanism comprising a latch member 23 of bell-crank form pivoted on said body adjacent to said end-gate. Formed upon one arm of said latch member is a downwardly extending hook-like lug 23ᵃ which, in the normal positions of the parts, interlocks with a laterally directed lug 24 carried by the lower end portion of the end-gate, the latter having its upper portion pivoted to said body. The opposite arm of said latch member 23 has pivoted thereto the rear end of a longitudinally extending rod 36 which is pivoted at its opposite end to an arm of a bell-crank lever 25 pivotally mounted upon the body 3 at a suitable point. Said lever 25 has attached to the opposite arm thereof an end of a chain 26 which has its opposite end attached to a stationary part of the truck, as to an anchor lug 27 fixed upon a sill 1. The arrangement of the mechanism just described is such that just prior to the moment when the body reaches its dumping position, the chain 26 is placed under tension whereby, through the intermediacy of the bell-crank 25 and rod 36, the latch member 23 is swung to a position in which its lug 23ᵃ is withdrawn from interlocking relation to the end-gate, permitting the latter to swing open.

Figure 4:
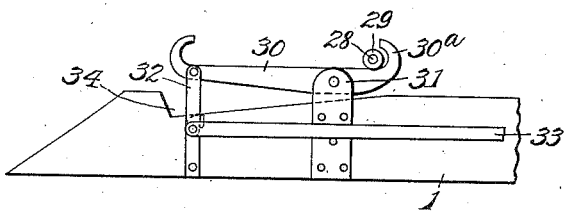
Figs. 4 and 5 are detail views illustrating a modified form of mounting for the body.
Figure 5:
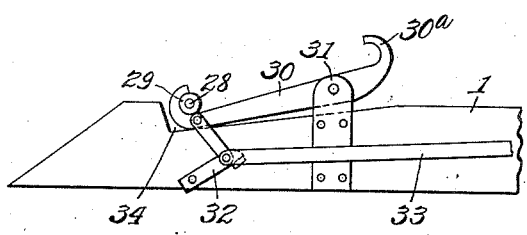

In the modification illustrated in Figs. 4 and 5, the pivot-pins 28 carried by the bolster 50 have rollers 39 mounted thereon. These rollers rest upon the upper surfaces of longitudinally disposed bars 30 which constitute trackways for said rollers and which are superposed over the rear end portions of the sills 1. Each of said bars 30 is pivotally mounted intermediate its ends, as upon bearing pieces 31 carried by the adjacent sill, and has its rear end pivoted to the upper end of one member of a toggle lever 32 which normally occupies upright position and has the other member thereof pivotally mounted upon said sill. In the normal upright position of said toggle 32 the upper surface of the rear end of the bar 30 is elevated somewhat above that of the forward end, so that the rollers 29 which support the truck body will occupy the most advanced position permitted by an upturned stop 30ᵃ formed on the front end of the bar 30, as shown in Fig. 4. When the body is to be shifted to dumping position, a longitudinally extending rod or bar 33, which is pivoted at its rear end to the toggle 32 at the joint between the members of the latter, is shifted forward for breaking the joint of the toggle, whereby the rear end of the bar 30 is drawn downward to a rearwardly inclined position, as shown in Fig. 5, such inclination being permitted by providing in the sill the notched out portion, or recess, 34. When the inclinations of the opposite bars 30 are thus reversed, the rollers 29 travel rearward by gravitation on said bars until they engage upturned stops similar to said stops 30ª formed on the rear ends of the bars 30, at which point the center of gravity has become shifted to the extent that the body 3 swings automatically to inclined dumping position.

It will be noted that, in moving the truck body to dumping position, the force of gravity is utilized with both the preferred and modified forms of construction of the invention hereinbefore described, the initial movement only being produced by manually applied force.

What is claimed is—

1. A dump truck comprising sills, a dump body superposed over said sills, supports pivotally mounted upon said sills and movable with respect to the latter, said body being pivotally mounted intermediate its ends upon said supports, means for elevating the front end of said body and simultaneously inclining said supports in an upward and rearward direction whereby said body and the center of gravity of the latter are so shifted that said body thence moves automatically to rearwardly inclined dumping position.

2. A dump truck comprising sills, a dump body superposed over said sills, supports pivotally mounted upon said sills, members pivotally carried by said supports and having said body pivotally mounted thereon, said members and said supports being shiftable with respect to the pivotal mounting of the latter, and means for elevating the front end of said body and simultaneously shifting the relative positions of said supports and said members whereby said body is carried rearward on the latter to a point at which the force of gravity becomes operative for carrying said body to inclined dumping position.

3. A dump truck comprising sills, a dump body superposed over said sills, supports pivotally mounted upon said sills, members pivotally carried by said supports and having said body pivotally mounted thereon, said members and said supports being shiftable with respect to the pivotal mountings of the latter, and means for elevating the front end of said body and simultaneously actuating said members to swing to an upwardly and rearwardly inclined position on said supports whereby the center of gravity is shifted for causing said body to move to inclined dumping position.

4. A dump truck comprising sills, a dump body superposed over said sills, supports pivotally mounted upon said sills and depending therefrom, members pivotally attached to the lower ends of said supports and having said body pivotally mounted upon the upper ends thereof, said members being normally disposed in upwardly and forwardly inclined positions for maintaining said body in its normal horizontal position, means for manually elevating the front end of said body, and means intermediate said elevating means and the lower ends of said members and actuated by the former whereby the latter are shifted to rearwardly inclined positions for carrying said body rearward to a position wherein the force of gravity becomes operative for actuating said body to assume inclined dumping position.

5. A dump truck comprising sills, a dump body superposed over said sills, supports pivotally mounted upon said sills and depending therefrom, members pivotally attached to the lower ends of said supports and having said body pivotally mounted upon the upper ends thereof, said members being normally disposed in upwardly and forwardly inclined positions for maintaining said body in its normal horizontal position, means for manually elevating the front end of said body, and means intermediate said elevating means and the lower ends of said members and actuated by the former whereby the latter are shifted to rearwardly inclined positions, and rollers adapted to be engaged by and to limit the extent of rearward movement of said members, said body being adapted to become overbalanced as the limit of rearward inclination of said members is approached and to automatically swing on the latter to load-dumping position.

6. A dump truck comprising sills, a dump body superposed over said sills, supports pivotally mounted upon said sills and depending therefrom, members pivotally attached to the lower ends of said supports and having said body pivotally mounted upon the upper ends thereof, said members being normally disposed in upwardly and forwardly inclined positions for maintaining said body in its normal horizontal position, means for manually elevating the front end of said body, and means intermediate said elevating means and the lower ends of said members and actuated by the former whereby the latter are shifted to rearwardly inclined positions, and rollers adapted to be engaged by and to limit the extent of rearward movement of said members, said body being adapted to become overbalanced as the limit of rearward inclination of said members is approached and to automatically swing on the latter to load-dumping position, said members being actuated to travel upward on said rollers as said dumping position is approached.

7. A dump truck comprising sills, a dump body superposed over said sills, supports pivotally mounted upon said sills and depending therefrom, members pivotally attached to the lower ends of said supports and having said body pivotally mounted upon the upper ends thereof, said members being normally disposed in upwardly and forwardly inclined positions for maintaining said body in its normal horizontal position, means for manually elevating the front end of said body, and a series of coöperating elements located intermediate said elevating means and said members and actuated by the former whereby the positions of the latter are changed to produce a shifting of the center of gravity for actuating said body to assume inclined load-dumping position.

In testimony whereof I affix my signature in presence of two subscribing witnesses.

BLAKE TAYLOR.

Witnesses:
CULVER H. COOK,
L. R. TUCKER.